US010555371B2

(12) United States Patent
Nord (10) Patent No.: US 10,555,371 B2
(45) Date of Patent: Feb. 4, 2020

(54) DEVICES AND METHODS FOR MULTI BEARER NETWORK COMMUNICATION (71) Applicant: Sony Corporation, Tokyo (JP)

(72) Inventor: Lars Nord, Lund (SE)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 15/116,900

(22) PCT Filed: Nov. 18, 2014

(86) PCT No.: PCT/EP2014/074861
§ 371 (c)(1),
(2) Date: Aug. 5, 2016

(87) PCT Pub. No.: WO2015/117688
PCT Pub. Date: Aug. 13, 2015

(65) Prior Publication Data
US 2017/0196044 A1 Jul. 6, 2017

(30) Foreign Application Priority Data

Feb. 6, 2014 (EP) .................................... 14154067

(51) Int. Cl.
H04W 88/06 (2009.01)
H04W 52/02 (2009.01)
(Continued)

(52) U.S. Cl.
CPC .......... *H04W 88/06* (2013.01); *H04W 48/10* (2013.01); *H04W 52/0258* (2013.01);
(Continued)

(58) Field of Classification Search
CPC ......... H04W 36/0022; H04W 36/0027; H04W 36/165; H04W 36/22; H04W 52/0209;
(Continued)

(56) References Cited

U.S. PATENT DOCUMENTS

2005/0186906 A1* 8/2005 Hussmann ........ H04W 52/0232
455/41.2
2009/0323569 A1* 12/2009 Wentink ................ H04W 48/10
370/311

(Continued)

OTHER PUBLICATIONS

International Search Report and Written Opinion of the International Searching Authority, Application No. PCT/EP2014/074861, dated Dec. 15, 2014.

*Primary Examiner* — Pao Sinkantarakorn
(74) *Attorney, Agent, or Firm* — Myers Bigel, P.A.

(57) ABSTRACT

A portable electronic device comprises a first wireless interface and a second wireless interface. The first wireless interface is controlled to perform a control signaling with a further device over the first wireless interface. The second wireless interface is selectively activated to transmit data traffic to the further device and/or to receive the data traffic from the further device over the second wireless interface. The first wireless interface is maintained in an activated state to control the data traffic over the second wireless interface by the control signaling over the first wireless interface while the second wireless interface is activated.

18 Claims, 6 Drawing Sheets (51) Int. Cl.
  *H04W 74/02*  (2009.01)
  *H04W 74/08*  (2009.01)
  *H04W 48/10*  (2009.01)
  *H04W 84/12*  (2009.01)

(52) U.S. Cl.
  CPC ......... *H04W 74/02* (2013.01); *H04W 74/085* (2013.01); *H04W 74/0816* (2013.01); *H04W 74/0825* (2013.01); *H04W 74/0858* (2013.01); *H04W 84/12* (2013.01); *Y02D 70/00* (2018.01)

(58) Field of Classification Search
  CPC ......... H04W 52/0222; H04W 52/0274; H04W 52/028; H04W 76/025; H04W 76/026; Y02B 60/50; Y02D 70/00–70/48
  See application file for complete search history.

(56) References Cited

U.S. PATENT DOCUMENTS

| | | | | |
|---|---|---|---|---|
| 2013/0109315 A1* | 5/2013 | Polo | ................ | H04W 52/0274 455/41.2 |
| 2015/0319555 A1* | 11/2015 | Cordeiro | ................ | H04L 69/18 455/41.2 |
| 2015/0382274 A1* | 12/2015 | Logvinov | ........... | H04L 41/0833 370/311 |

\* cited by examiner

DEVICES AND METHODS FOR MULTI BEARER NETWORK COMMUNICATION

CROSS REFERENCE TO RELATED APPLICATIONS

This application is a 35 U.S.C. § 371 national stage application of PCT International Application No. PCT/EP2014/074861, filed on Nov. 18, 2014, which itself claims priority to European Application No. 14154067.4, filed Feb. 6, 2014, the disclosure and content of both of which are incorporated by reference herein in their entireties. The above-referenced PCT International Application was published in the English language as International Publication No. WO 2015/117688 A1 on Aug. 13, 2015.

FIELD OF THE INVENTION

Embodiments of the invention relate to devices configured for wireless communication. Embodiments of the invention in particular relate to devices and methods which can be used for communication in mesh networks which support multiple bearers.

BACKGROUND OF THE INVENTION

Wireless data communication continues to evidence significant growth. Wi-Fi-based networks are one example for networks used to provide local connectivity, e.g. for tethering devices to a wide area network or for other local communication scenarios. In a wireless mesh network, devices may be configured to communicate in a mesh network topology using the IEEE802.11s standard, for example.

Many mesh networks are traditionally based on stationary Wi-Fi nodes. It would be desirable to use portable devices as nodes for a Wi-Fi mesh network. However, it may be challenging to provide adequate battery lifetime for a portable device which acts as a node in a Wi-Fi network. The long term power consumption of a Wi-Fi interface may rapidly drain the battery power of a portable device, in particular when it acts as a as a gateway, i.e. a soft access point. For illustration, in a Wi-Fi mesh network all nodes are typically active even when data is not sent via them. The reason for this is the lack of good and deployed "active" sleep modes in Wi-Fi. The power consumption of this active mode with no data may rapidly drain battery power and may decrease battery lifetime.

While other communication standards, such as Bluetooth, Bluetooth Low Energy (BLE), Zigbee, Wibree, Near Field Communication (NFC), or Z-wave do not suffer from significant power consumption outlined above, the bandwidth provided by these techniques may not be sufficient for the bit rate requirements which may be required by tethering services, for example.

SUMMARY OF THE INVENTION

There is a need for portable electronic devices, methods and systems in which a portable electronic device can provide high bit rate communication to accommodate larger data traffic bandwidths, while mitigating the power consumption problems which are associated with a continued operation of a Wi-Fi interface.

According to exemplary embodiments of the invention, portable electronic devices are configured to use different bearers for different functions needed in a network. A first bearer may provide low power consumption and may be used for control signaling. A second bearer may provide higher bandwidth and may be used for data traffic. The portable electronic device may maintain a first wireless interface in an active state even when the portable electronic device is in a low power mode, to support control signaling or low bandwidth data communication over the first wireless interface. The portable electronic device may selectively activate the second wireless interface to transmit or receive data traffic when larger bit rates are required. The first wireless interface may be maintained in an active state to continue the control signaling over the first wireless interface. Such a portable electronic device and method combines low energy connectivity with efficient high bandwidth connectivity.

A portable electronic device according to an embodiment is configured for multi bearer communication and comprises a first wireless interface, a second wireless interface different from the first wireless interface, and a processing device. The processing device is coupled to the first wireless interface and to the second wireless interface. The processing device is configured to perform a control signaling with the further device over the first wireless interface. The processing device is configured to selectively activate the second wireless interface to transmit data traffic to the further device and/or to receive the data traffic from the further device over the second wireless interface. The processing device is configured to maintain the first wireless interface in an activated state to control the data traffic over the second wireless interface by the control signaling over the first wireless interface while the second wireless interface is activated.

The activated second wireless interface has a second power consumption and the first wireless interface has a first power consumption when in the activated state, the first power consumption being less than the second power consumption. This allows the portable electronic device to decrease its power consumption when no high data bandwidths are required.

The first wireless interface may be configured for communication on a first bearer and the second wireless interface may be configured for communication on a second bearer different from the first bearer. This allows the interfaces to be tailored for their respective functions, i.e., providing low power connectivity and providing high bandwidths when the need arises, respectively.

The second bearer may be different from the first bearer in at least one of modulation technique or frequency band.

The processing device may be configured to selectively activate the second wireless interface in response to a trigger event for increasing a data communication bandwidth between the portable electronic device and the further device. The processing device may be configured to maintain the second wireless interface in an inoperative state in which it does not even receive beacon or wake-up signals before the trigger event is detected. By using two interfaces the wake-up signaling for the second wireless interface can be performed over the first wireless interface.

The trigger event may be a receipt of a routing request, of a request for activating a tethering service to tether the further device to a wide area network, or of a request for relaying the data traffic while the tethering service is active. The trigger event may be any other control message received at the first wireless interface which indicates that larger data bandwidths are required.

The processing device may be configured to relay the data traffic between the wide area network and the further device only over the second wireless interface. High bandwidth data connectivity may thereby be provided.

The processing device may be configured to transmit and/or receive a control message over the first wireless interface for controlling the data traffic if the control message is contained in a data packet having a size which is smaller than a threshold size. Small data packets can thereby be offloaded from the high bandwidth bearer of the second wireless interface to the low bandwidth bearer of the first wireless interface.

The control message transmitted over the first wireless interface may be a control message for adjusting a data rate of the data traffic and/or acknowledging receipt of a packet of the data traffic. Data traffic control may thereby be implemented using the low bandwidth, low power communication over the first wireless interface.

The processing device may be configured to control the first wireless interface to transmit broadcast messages while the second wireless interface is activated. The portable electronic device may thereby broadcast messages to several further devices in a mesh network even when the second wireless interface does not support broadcasting suitable messages.

The processing device may be configured to maintain the second wireless interface in an inoperative state prior to detecting the trigger event. The processing device may be configured to set the second wireless interface to an inoperative state in response to detecting that the bandwidth provided by the second wireless interface is no longer required. The inoperative state of the second wireless interface may be a state in which the second wireless interface is not configured to receive any wake-up message over the second wireless interface. Wake-up of the second wireless interface may be performed by signaling over the first wireless interface.

The processing device may be configured to adjust a data rate of the data traffic over the second wireless interface by the control signaling over the first wireless interface.

The processing device may be configured to monitor receipt of a data packet from the further device at the second wireless interface, and to transmit a positive or negative acknowledgment message for the data packet over the first wireless interface to the further device.

The second wireless interface may be an interface configured for transmitting and receiving Wi-Fi signals or another broadband wireless interface technology.

The first wireless interface may be a Bluetooth Low Energy, BLE, interface. A BLE interface and Wi-Fi interface have comparable operation ranges and lend themselves to being used in combination to provide low power, low bandwidth connectivity in combination with higher bandwidth data communication which is selectively activated as the need arises.

The first wireless interface may be configured as a Zigbee, Wibree, Near Field Communication (NFC), Z-wave interface, or another low power interface technology.

The portable electronic device may be a user equipment of a cellular communication network. The portable electronic device may be a user equipment of a Long Term Evolution (LTE) cellular communication network.

The portable electronic device may be configured to act as a soft access point of a Wi-Fi mesh network.

A communication system according to an embodiment comprises the portable electronic device according to an embodiment and a further device which has a further first wireless interface configured for communication with the first wireless interface of the portable electronic device. The further device has a further second wireless interface configured for communication with the second wireless interface of the portable electronic device.

The further device may be configured to perform a control signaling with the portable electronic device over the first wireless interface to request activation of the second wireless interface for supporting data traffic with higher bandwidths.

The communication system may comprise a wide area network. The portable electronic device may be configured to provide a tethering service for tethering the further device to the wide area network. The portable electronic device may be configured to activate the second wireless interface for transmitting and/or receiving the traffic data for the tethering service.

A method of communicating in a multi bearer network according to an embodiment comprises operating a first wireless interface of a portable electronic device to perform a control signaling with a further device. The method comprises selectively activating a second wireless interface of the portable electronic device for transmitting data traffic to the further device and/or for receiving the data traffic from the further device. The second wireless interface is different from the first wireless interface. The method comprises maintaining the first wireless interface in an activated state to control the data traffic over the second wireless interface by the control signaling over the first wireless interface while the second wireless interface is activated.

The method may be performed by the portable electronic device according to any embodiment disclosed herein.

In the method, the activated second wireless interface may have a second power consumption and the first wireless interface may have a first power consumption when in the activated state, the first power consumption being less than the second power consumption.

In the method, the first wireless interface may be configured for communication over a first bearer and the second wireless interface may be configured for communication over a second bearer different from the first bearer. The second bearer may be different from the first bearer in at least one of modulation technique or frequency band.

In the method, the second wireless interface may be activated in response to a trigger event for increasing a data communication bandwidth between the portable electronic device and the further device. The second wireless interface may be maintained in an inoperative state in which it does not even receive beacon or wake-up signals before the trigger event is detected.

In the method, the trigger event may be a receipt of a request for relaying the traffic data. The request may be received at the first wireless interface. The request may cause the second wireless interface to relay the traffic data, e.g. when a tethering service to tether the further device to a wide area network is activated. The trigger event may be any other control message received at the first wireless interface which indicates that larger data bandwidths are required.

The method may comprise relaying the data traffic between the wide area network and the further device only over the second wireless interface.

In the method, a control message may be transmitted or received over the first wireless interface for controlling the data traffic if the control message is contained in a data packet having a size which is smaller than a threshold size.

A control message transmitted over the first wireless interface may be a control message for adjusting a data rate of the data traffic and/or acknowledging receipt of a packet of the data traffic.

In the method, the first wireless interface may be controlled to transmit broadcast messages while the second wireless interface is activated.

The method may comprise setting the second wireless interface to an inoperative state in response to detecting that the bandwidth provided by the second wireless interface is no longer required. The inoperative state may be a state in which the second wireless interface is not configured to receive any wake-up message over the second wireless interface.

In the method, a data rate of the data traffic over the second wireless interface may be adjusted by the control signaling over the first wireless interface.

The method may comprise monitoring receipt of a data packet from the further device at the second wireless interface, and transmitting a positive or negative acknowledgment message for the data packet over the first wireless interface to the further device.

In the method, the second wireless interface may be an interface configured for transmitting and receiving Wi-Fi signals or another broadband technology. The first wireless interface may be a BLE interface. The first wireless interface may be a Zigbee, Wibree, Near Field Communication (NFC), Z-wave interface, or another low power wireless technology.

In the method, the portable electronic device may be a user equipment of a cellular communication network.

In embodiments of the invention, a low power connectivity may be provided while the second wireless interface is inactive. Higher data bandwidths can be accommodated as the need arises by activating the second wireless interface. By maintaining the first wireless interface in an active state even when the second wireless interface is in an active state, small data packets, in particular for control signaling, may be offloaded to the first wireless interface. Inefficient transmission of small data packets over a large bandwidth interface may thereby be prevented.

Although specific features described in the above summary and the following detailed description are described in connection with specific embodiments and aspects of the present invention, it should be understood that the features of the embodiments and aspects may be combined with each other unless specifically noted otherwise.

BRIEF DESCRIPTION OF THE DRAWINGS

Embodiments of the invention will be described in more detail with reference to the accompanying drawings in which identical reference numerals designate identical features.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Identical or like reference numerals are used to designate identical or like components. Any coupling between components or devices shown in the figures may be a direct or indirect coupling unless specifically noted otherwise.

While some embodiments will be described in the context of specific communication technologies, such as Wi-Fi or Bluetooth, other communication technologies may be implemented in other embodiments.

Figure 1:
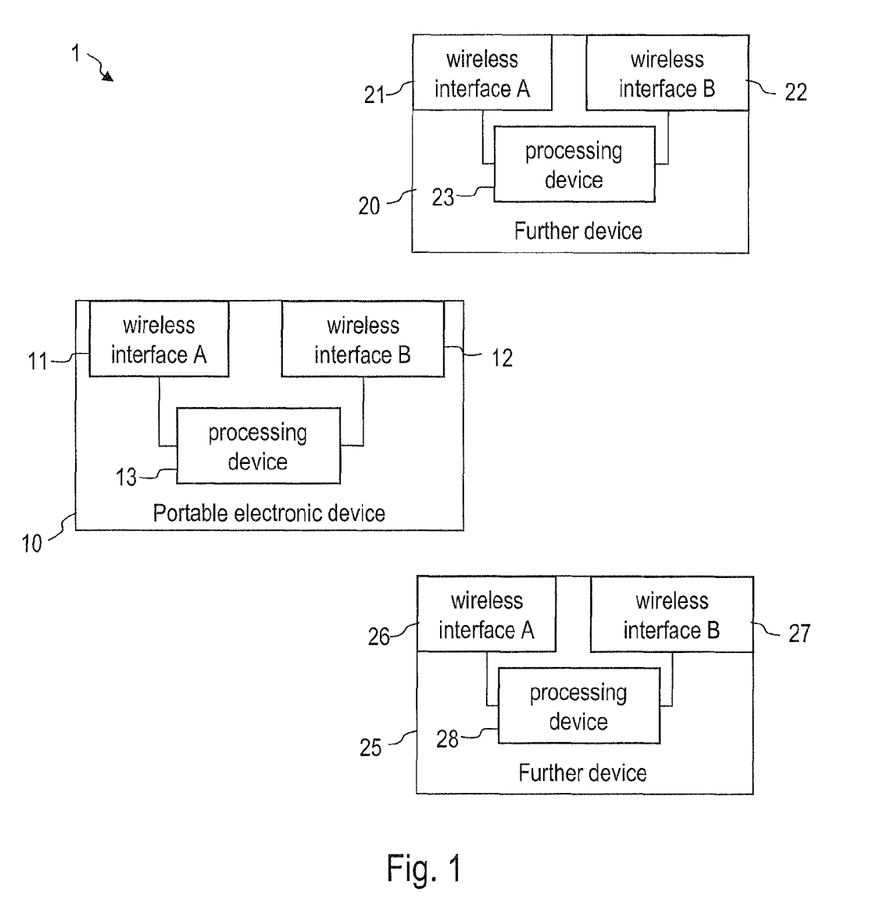
FIG. 1 is a schematic representation of a communication system according to an embodiment.

FIG. 1 is a schematic diagram of a communication system 1 according to an embodiment. The communication system 1 comprises a portable electronic device 10 and at least one further device 25, 20. The communication system 1 may have a mesh network topology or a star network topology.

The portable electronic device 10 includes a first wireless interface 11 and a second wireless interface 12. The first wireless interface 11 and the second wireless interface 12 may be configured to transmit and receive signals on different bearer carriers. The first wireless interface 11 and the second wireless interface 12 may be configured to transmit and receive signals using different frequency bands, different modulation techniques and/or different multiplexing schemes, for example. The portable electronic device 10 may include further interfaces. For illustration the portable electronic device 10 may have a third wireless interface configured for communication with a cellular communication network. The third interface may be configured for communication over an E-UTRA air interface. The portable electronic device 10 may be a user equipment for a cellular communication network, e.g. for an LTE network.

The at least one further device 20, 25 respectively has a further first wireless interface 21, 26 and a further second wireless interface 22, 27. The further first wireless interface 21, 26 is configured for communication with the first wireless interface 11 of the portable electronic device 10. The further second wireless interface 22, 27 is configured for communication with the second wireless interface 12 of the portable electronic device 10. The further device 20, 25 may, but does not need to be configured as a mobile device, e.g. a user equipment of the cellular communication network.

Generally, the first wireless interface 11 has a power consumption which is less than a power consumption of the second wireless interface 12 of the portable electronic device 10 when both interfaces are in their fully operative state. The first wireless interface 11 may have a power consumption which is less than a power consumption of the second wireless interface 12 in a sleep mode. The first wireless interface 11 provides a communication bandwidth which is less than that of the second wireless interface 12.

Generally, and as will be described in more detail below, only the first wireless interface 11 is maintained in an active state to provide low power connectivity which supports a first data rate when the portable electronic device 10 is in an idle mode or otherwise does not need to support large data bandwidths. The second wireless interface 12 can be selectively activated when a second data rate greater than the first data rate is required. The first wireless interface 11 is maintained in an active state and is used to perform control signaling or other low data rate signaling even when the second wireless interface 12 is activated for transmitting or receiving data traffic. I.e., the portable electronic device 10 does not perform a switching from one communication technology to another communication technology, but rather performs a transition from an operation mode in which only one of the wireless interfaces 11, 12 is used to another operation mode in which both wireless interfaces 11, 12 are in an active state, so as to use different radio communication technologies as control channel and data channel.

Similarly, the further first wireless interface 21, 26 has a power consumption which is less than a power consumption of the further second wireless interface 22, 27 of the further device 20, 25. The further first wireless interface 21, 26 provides a communication bandwidth which is less than that of the further second wireless interface 22, 27. Generally, and as will be described in more detail below, only the further first wireless interface 21, 26 is maintained in an active state to provide low power connectivity which supports a first data rate the further device 20, 25 is in an idle mode or otherwise does not need to support large data bandwidths. The further second wireless interface 22, 27 can be selectively activated when a second data rate greater than the first data rate is required. The further first wireless interface 21, 26 is maintained in an active state and is used to perform control signaling or other low data rate signaling even when the further second wireless interface 22, 27 is activated for transmitting or receiving data traffic. I.e., the further device 20, 25 does not perform a switching from one communication technology to another communication technology, but rather performs a transition from an operation mode in which only one of the wireless interfaces is used to another operation mode in which both wireless interfaces are activated.

The first wireless interface 11 may be configured for transmitting and receiving Bluetooth signals. The first wireless interface 11 may be configured for transmitting and receiving Bluetooth Low Energy, BLE, signals. The BLE interface may be configured to operate according to Bluetooth Core Version 4.0 (adopted on 30 Jun. 2010), Specification Volume 6 entitled "Core System Package [Low Energy Controller volume]", or in Bluetooth Core Specification 4.1 (adopted on 3 Dec. 2013), Specification Volume 6 entitled "Core System Package [Low Energy Controller volume]". Similarly, the further first wireless interface 21, 26 may be a Bluetooth interface. The further first wireless interface 21, 26 may be a BLE interface. Communication may be performed using a Bluetooth bearer carrier for BLE.

The first wireless interface 11 may generally be configured as a BLE interface, for example, modified so as to transmit and receive control signaling for the data traffic which is transmitted or received using a different radio technology, i.e., over the second wireless interface 12. This will be explained in more detail below. While the first wireless interface 11 may also be referred to as BLE interface herein, it is to be understood that the first wireless interface 11, even when it uses BLE technologies, is modified to support the transmission and receipt of control signaling for the data traffic which is transmitted or received using a different radio technology, i.e., over the second wireless interface 12.

Other communication techniques may be used for implementing a low power connectivity. For illustration, the first wireless interface 11 and the further first wireless interface 21, 26 may be configured as a Zigbee, Wibree, Near Field Communication (NFC), Z-wave interface, or other interfaces which have a low power consumption.

The second wireless interface 12 of the portable electronic device 10 and the further second wireless interface 22, 27 of the further device 20, 25 may respectively be configured to transmit and receive Wi-Fi signals. As will be described in more detail in the following, the portable electronic device 10 and the further device 20, 25 are configured such that the second wireless interface 12 is maintained in an inoperative state when the data rates supported by the first wireless interface 11 are sufficient for the respective operation state. Similarly, the further second wireless interface 22, 27 of the further device 20, 25 are maintained in an inoperative state when the data rates supported by the further first wireless interface 21, 26 are sufficient for the respective operation state. In the inoperative state, the second wireless interface 12 may have a power consumption which is less than a power consumption of a Wi-Fi interface in the "Notice of absence", NoA, and/or the "opportunistic power save" modes of operation defined for Wi-Fi. In the inoperative state, the second wireless interface 12 may be in a continuous sleep state in which it is not configured to receive any messages until it is woken up under the control of the processing device 13. Similarly, the further second wireless interface 22, 27 may be maintained in an inoperative state and may be woken up only when higher data rates are required.

The second wireless interface 12 may generally be configured as a Wi-Fi interface, for example, modified such that all or at least some of the control signaling required for controlling the data traffic over the second wireless interface 12 is not transmitted over the second wireless interface 12 itself. As will be explained in more detail below, all or at least some of the control signaling required for controlling the data traffic over the second wireless interface 12 may be transmitted and received over the first wireless interface 11. Even when the second wireless interface 12 uses Wi-Fi technologies and may therefore be referred to as Wi-Fi interface herein, it is to be understood that the interface is modified compared to a conventional Wi-Fi interface, and that at least some of the control signaling for the Wi-Fi data traffic is not transmitted or received over the second wireless interface 12.

The portable electronic device 10 has a processing device 13. The processing device 13 is coupled to the first wireless interface 11 and to the second wireless interface 12 and is configured to control operation of the first wireless interface 11 and of the second wireless interface 12. The processing device 13 may comprise one or several microprocessors, one or several microcontrollers, one or several processors, one or several controllers, one or several application specific integrated circuits (ASICs) and/or a combination of such devices. In operation of the portable electronic device 10, the processing device 13 may selectively bring the second wireless interface 12 to an active state to support higher data rates. The further device 20, 25 may also have a processing device configured in the same way as the processing device 13.

As will be described in more detail with reference to FIG. 2 to FIG. 8 below, the processing device 13 is configured to control operation of the portable electronic device 10 such that only the first wireless interface 11 is in an active state in a network idle mode or in another mode in which no high data rate must be supported. The processing device 13 is configured to control operation of the portable electronic device 10 such that both the first wireless interface 11 and the second wireless interface 12 are in an active state when the portable electronic device 10 acts as an access point for Wi-Fi tethering, is requested to route data for other reasons, or must support higher data rates for other reasons. In this case, control signaling for controlling the data traffic over the second wireless interface 12 may still be transmitted and/or received over the first wireless interface 11 to offload smaller data packets from the second wireless interface 12 to the first wireless interface 11.

Figure 2:
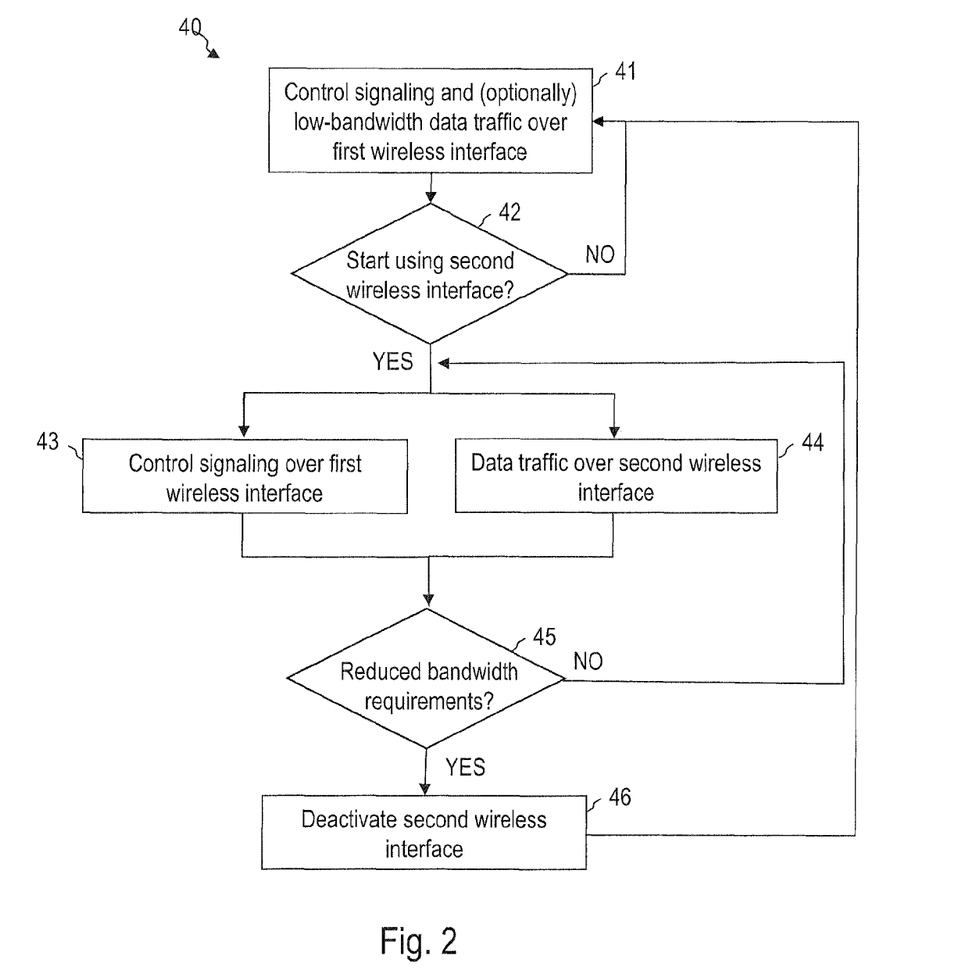
FIG. 2 is a flow chart of a method according to an embodiment.

FIG. 2 is a flow chart of a method 40 according to an embodiment. The method 40 may be performed by the portable electronic device 10 according to an embodiment.

At 41, the portable electronic device 10 may be in a network idle mode or in another operation state which does not require the portable electronic device 10 to support high data rate communication. Control signaling may be performed over the first wireless interface 11. Optionally, data traffic may also be transmitted or received over the first wireless interface to at least one further device 20, 25 which is located within a coverage area of the first wireless interface 11.

At 42, the portable electronic device 10 determines whether it shall activate the second wireless interface. The determining at step 42 may include monitoring a trigger event. For illustration, receipt of a request from the further device 20, 25 may cause the portable electronic device 10 to provide a tethering service in which the portable electronic device 10 acts as a Wi-Fi access point. If the portable electronic device 10 detects that the second wireless interface 12 does not need to be activated, the method may return to step 41.

If the portable electronic device 10 detects that the second wireless interface 12 is to be activated, the second wireless interface 12 is activated while the first wireless interface 11 is maintained in the active state. Communication between the portable electronic device 10 and the further device 20, 25 is performed using multiple bearers which are provided by the first wireless interface 11 and by the second wireless interface 12. Data traffic which includes payload data is transmitted and/or received over the second wireless interface 12 at 44. Control signaling for controlling the data traffic may still be transmitted and/or received over the first wireless interface 11 at 43.

In some embodiments, the second wireless interface 12 may be used to transmit only data traffic which does not include any control signaling. The data traffic may be payload data, encapsulated in data packets. In other embodiments, at least some control messages may be transmitted over the second wireless interface 12.

When both the first wireless interface 11 and the second wireless interface 12 are activated, the processing device 13 may select, depending on a packet size of a control message, whether a control message is to be transmitted over the first wireless interface 11 or over the second wireless interface 12. The processing device 13 may generally be configured to use the first wireless interface 11 for transmission and receipt of data packets which have a small size, e.g. which have a size less than a threshold, to thereby reduce the transmission of small packets over the second wireless interface 12.

At 45, the processing device 13 may determine whether bandwidth requirements have been reduced again such that the second wireless interface 12 is no longer needed. This may happen when a tethering mode is deactivated, when an inactivity timer has been released, when no data traffic must be relayed because the further device has no data to transmit or receive while a tethering mode is still active, and/or when the second wireless interface 12 is set to an inactive state for other reasons, for example. The processing device 13 may continue using the first wireless interface and the second wireless interface for control signaling and data traffic at steps 43, 44, respectively, when the bandwidth requirements have not yet been reduced again.

At 46, the processing device 13 may set the second wireless interface 12 to an inactive state again when it is determined that the first wireless interface 11 is sufficient to provide the bandwidth which is needed. The second wireless interface 12 does not need to be operative to receive wake-up signals in the inactive state, because the low power connectivity provided by the first wireless interface 11 can be used for activating the second wireless interface 12. The method may return to step 41.

The combination of low power connectivity provided by the first wireless interface and the larger bandwidth provided by the second wireless interface which can be selectively activated and deactivated allows power consumption to be reduced.

For illustration, for a first wireless interface implemented as a BLE interface, the power consumption is significantly smaller than the power consumption of a Wi-Fi interface operated in "Notice of absence", NoA, or "opportunistic power save" modes. The reduction in power consumption can be obtained without any increase, or even with a decrease, in latency.

The first bearer, which may be a BLE bearer, may be used as a control channel. The second bearer, which may be a Wi-Fi bearer, may be used as a traffic channel. The control and traffic channel can either coexist in the same band, e.g. a 2.4 GHz band, or may be separated in different frequency bands. For illustration, the control channel implemented using BLE may use the 2.4 GHz band and the traffic channel implemented using Wi-Fi may use the 5 GHz band.

Signaling in communication systems according to embodiments will be described in more detail with reference to FIG. 3 to FIG. 6. The control signaling, which may be implemented using BLE or another low power interface, may be used as network control channel. The control signaling may be used for service discovery, location management, mesh synchronization and mesh maintenance and/or optionally for low bit rate services, for example.

Beacons transmitted over the first wireless interface may also provide additional location data which can be used by the devices in the mesh network for a mesh routing scheme.

Once the portable electronic device 10 detects a routing request, the portable electronic device 10 will respond and will dynamically re-establish a broadband connection. The second wireless interface, which may be a Wi-Fi interface, may be activated to establish a Wi-Fi connection.

Figure 3:
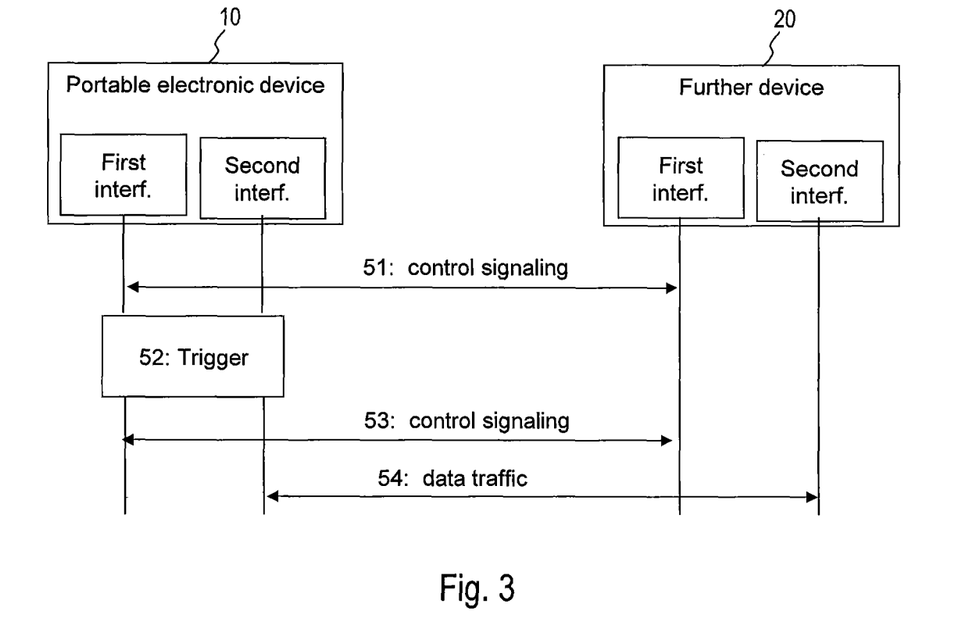
FIG. 3 illustrates signaling for a portable electronic device according to an embodiment.

FIG. 3 is a diagram which shows signaling in a communication system according to an embodiment.

In a network idle mode, the portable electronic device 10 may use the first wireless interface for control signaling 51. The control signaling 51 may include the transmission of beacons. The control signaling 51 may be used by the further device 20 and the portable electronic device 10 to identify other devices in the mesh network or to receive location information. The portable electronic device 10 and the further device 20 may use this information for location management, mesh synchronization and mesh maintenance, and for determining routes in the mesh network. For illustration, the control signaling 51 may be used for at least one of: service discovery; exchange of Wi-Fi connection parameters; exchange and broadcast of network management parameters; monitoring of beacons and updating a mesh table with possible neighbors in the mesh network and the location of those; and/or requesting establishment of a Wi-Fi connection.

A trigger event 52 may cause the portable electronic device to establish a connection using the second wireless interface. The trigger event may be receipt of a routing request which causes the portable electronic device 10 to route data traffic in the mesh network. The trigger event may cause the portable electronic device 10 to establish a data traffic connection over the second wireless interface. The data traffic connection may be a Wi-Fi broadband connection.

The first wireless interface may still be used for control signaling 53 even when the second wireless interface 12 is in the active state for transmitting and/or receiving the data traffic 54. For illustration, the control signaling 53 may be used for at least one of: exchange of Wi-Fi connection parameters; exchange and broadcast of network management parameters; monitoring of beacons and updating a mesh table with possible neighbors in the mesh network and the location of those.

While not shown in FIG. 3 to FIG. 6, the first interlace may not only be used for control signaling, but may also be used for providing low bit rate services. Examples for such low bit rate services include reading out a sensor, transmission of a message according to a short message service (SMS), and/or voice communication. For a first wireless interlace which is configured as a BLE interface, the first wireless interface may also be used for general broadcast services which are supported by BLE. This applies both in the state prior to activation of the second wireless interface and in the state in which the second wireless interface is activated.

Figure 4:
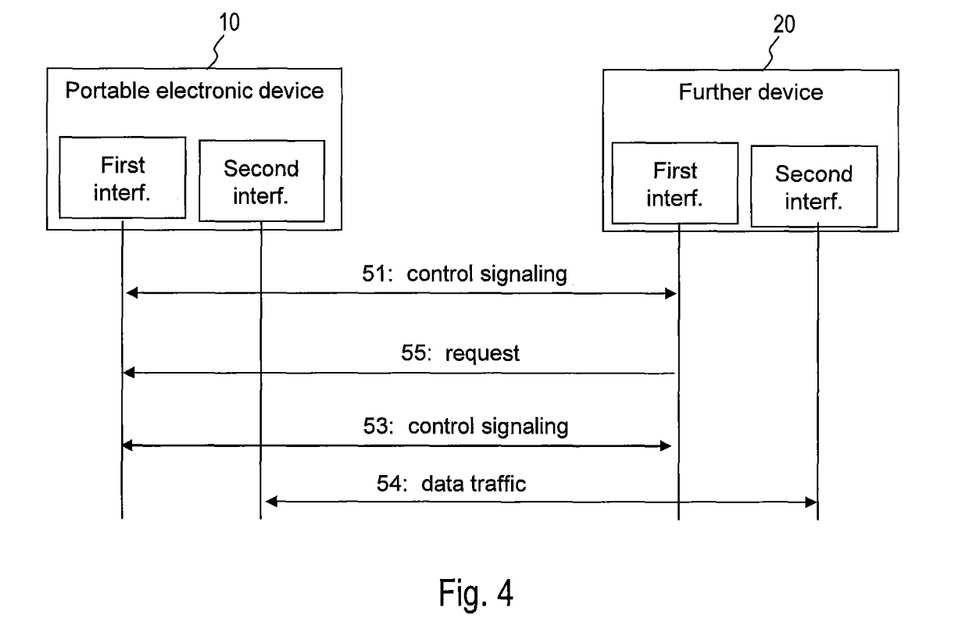
FIG. 4 illustrates signaling for a portable electronic device according to an embodiment.

FIG. 4 is a diagram which shows signaling in a communication system according to an embodiment. Receipt of a routing request 55 or of a tethering request 55 acts as a trigger event which causes the portable electronic device 10 to set up a connection over the second wireless interlace.

When a connection between the portable electronic device and the further device 20 has been established over the second wireless interface, which may be a Wi-Fi interface, the connection between the first wireless interfaces may still be maintained. The connection between the first wireless interfaces may be used for control signaling, for example, without being limited thereto, as is exemplarily illustrated in FIG. 5 and FIG. 6.

Figure 5:
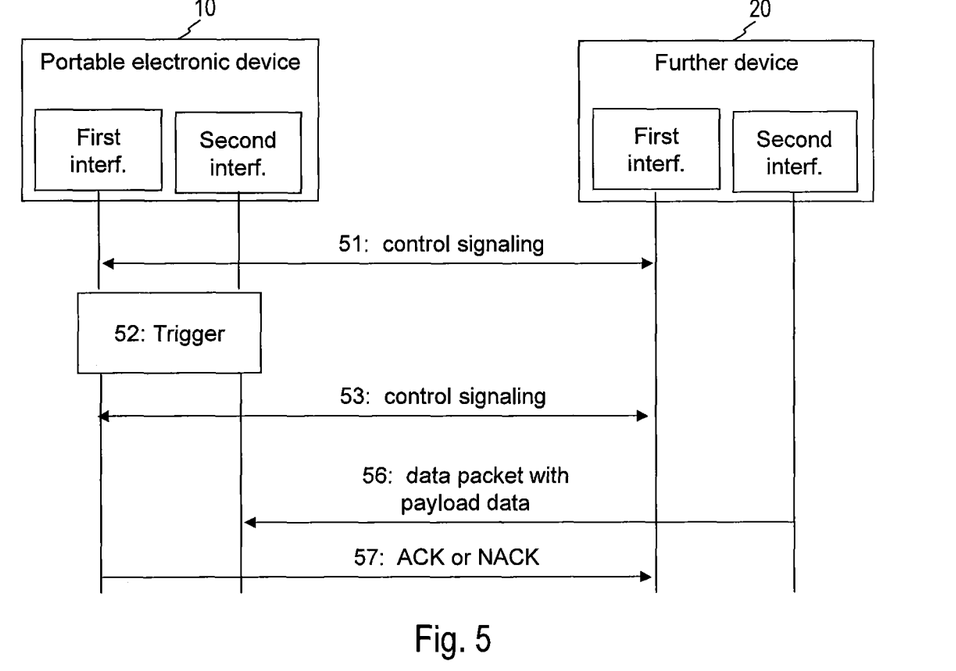
FIG. 5 illustrates signaling for a portable electronic device according to an embodiment.

FIG. 5 is a diagram which shows signaling in a communication system according to an embodiment. The connection between the first wireless interface of the portable electronic device 10 and the further first wireless interface of the further device 20 may be used for transmitting positive or negative acknowledgment messages. For illustration, the processing device of the portable electronic device 10 may monitor receipt of a data packet 56 which should be received at the second wireless interface. The data packet 56 may include payload data different from control information. A positive or negative acknowledgment message 57 for receipt of the data packet 56 which is received over the second wireless interface is generated. The positive or negative acknowledgment message 57 is transmitted over the first wireless interface. Thereby, small data packets such as positive or negative acknowledgment messages may be transmitted over a bearer channel which is configured for low power, low bit rate communication.

Figure 6:
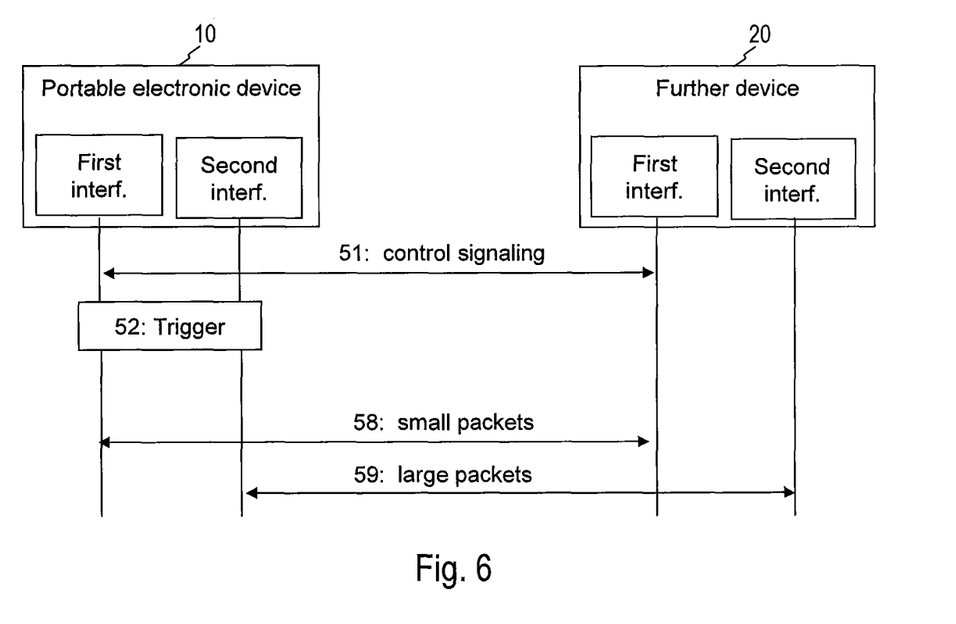
FIG. 6 illustrates signaling for a portable electronic device according to an embodiment.

FIG. 6 is a diagram which shows signaling in a communication system according to an embodiment. The connection between the first wireless interface of the portable electronic device 10 and the further first wireless interface of the further device 20 may be used for transmitting packets 58 having a size less than a threshold. The packets 58 include control packets which include control signaling. The packets 58 may additionally include data, e.g. data which is relayed to or from the further device. Thereby, the traffic load associated with such small packets on the second wireless interface may be reduced. Transmission of small packets may be offloaded from a connection having higher bit rate to a connection having smaller bit rate. The connection between the second wireless interface of the portable electronic device 10 and the further second wireless interface of the further device 20 may be used for transmitting packets 59 having a size greater than or equal to the threshold.

It will be appreciated that, as explained in detail with reference to FIG. 2 to FIG. 6, portable electronic devices according to embodiments are operative to use one radio technology as a control channel and another radio technology as a traffic channel. The first and second wireless interfaces are activated in parallel. This is in contrast to Heterogeneous Networks (HeNets), for example, which consist of multiple radio access technologies, but the network moves a user from one technology to another. In HeNets, control and traffic data is always within the same radio technology.

The portable electronic device according to an embodiment may be a user equipment of a cellular communication network. The portable electronic device may be a cellular phone or another communication apparatus configured for communication with a radio access network of a cellular communication network. The portable electronic device may have a third wireless interface which may be an E-UTRAN interface, as explained with reference to FIG. 7.

Figure 7:
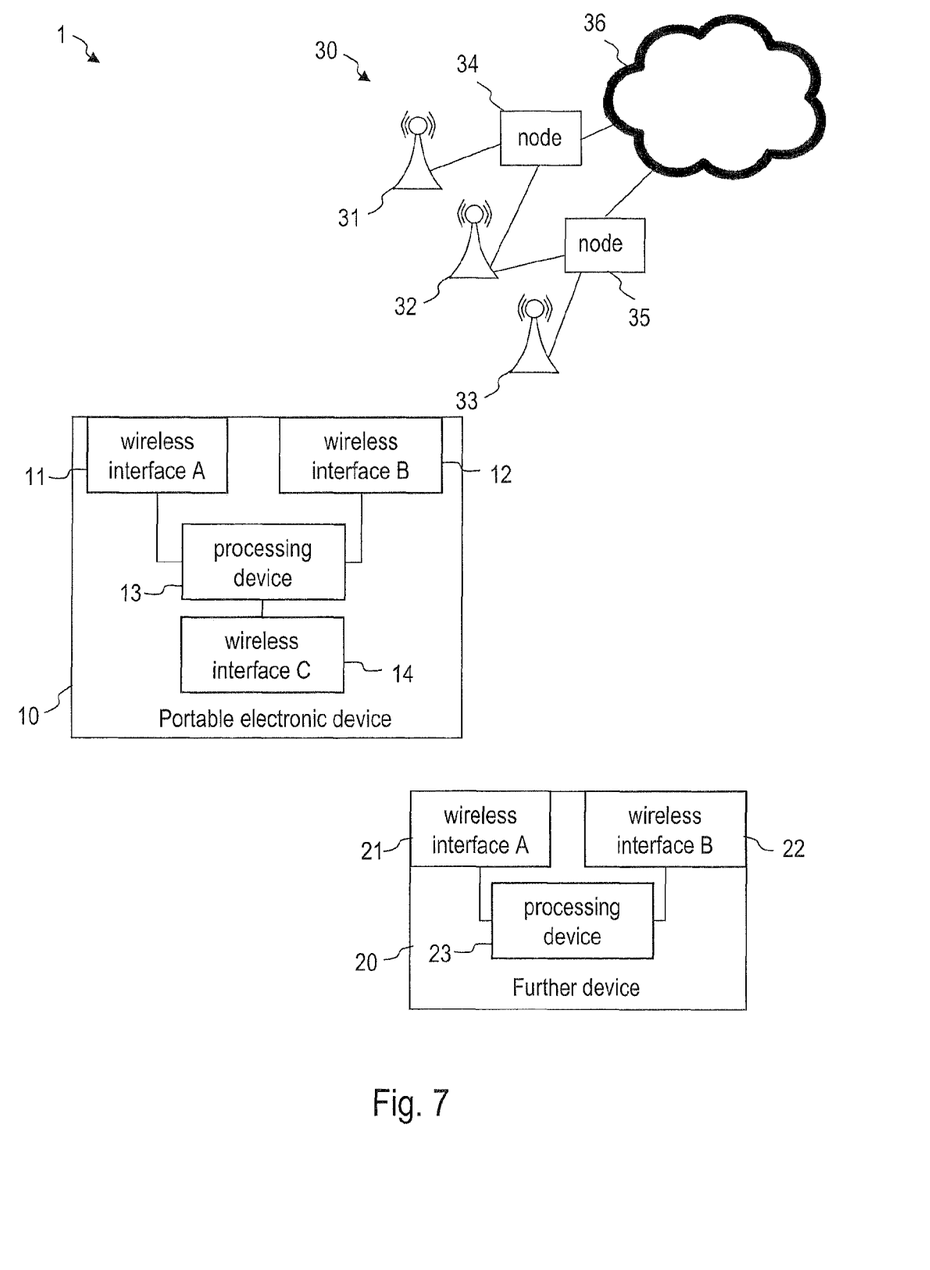
FIG. 7 is a schematic representation of a communication system according to an embodiment

FIG. 7 is a diagram which shows a communication system 1 according to an embodiment. The communication system 1 comprises a portable electronic device 10 and a cellular communication network 30. The communication system 1 may further comprise at least one further device 20 configured for communicating with the portable electronic device 10 over multiple bearers.

The cellular communication network 30 may include a plurality of base stations 31-33 which may respectively be configured as eNodeB. The cellular communication network 30 may have network nodes 34, 35 which may be a Mobility Management Entity (MME) and/or Serving Gateway (S-GW) in the operator core network, for example.

The portable electronic device 10 may include a third wireless interface 14 in addition to the first wireless interface 11 and the second wireless interface 12 which were described in detail with reference to FIG. 1 to FIG. 6. The third wireless interface 14 may be configured for communication over the E-UTRA air interface. The portable electronic device 10 may be configured to provide a tethering service. The portable electronic device 10 may enter a tethering mode in which it relays data traffic between a wide area network 30 connected to the radio access network and the further device 20. The wide area network 30 may be connected to the internet 36. The portable electronic device 10 may thereby act as a modem for the further device 20. The portable electronic device 10 may provide internet connectivity for the further device 20.

As explained with reference to FIG. 1 to FIG. 6 above, the processing device 13 of the portable electronic device 10 may control the portable electronic device 10 such that the first wireless interface 11 is used for transmitting and receiving control messages over a control channel, and the second wireless interface 12 is used for transmitting and receiving data traffic when required. In response to receiving a request from the further device 20, the processing device 13 controls the portable electronic device 10 to establish a connection between the second wireless interface 12 and the further second wireless interface 22. This connection is used for relaying data traffic between the internet 36 and the further device 20. The connections between the first wireless interface 11 and the further first wireless interface 21 is maintained for communicating control messages between the portable electronic device 10 and the further device 20.

Figure 8:
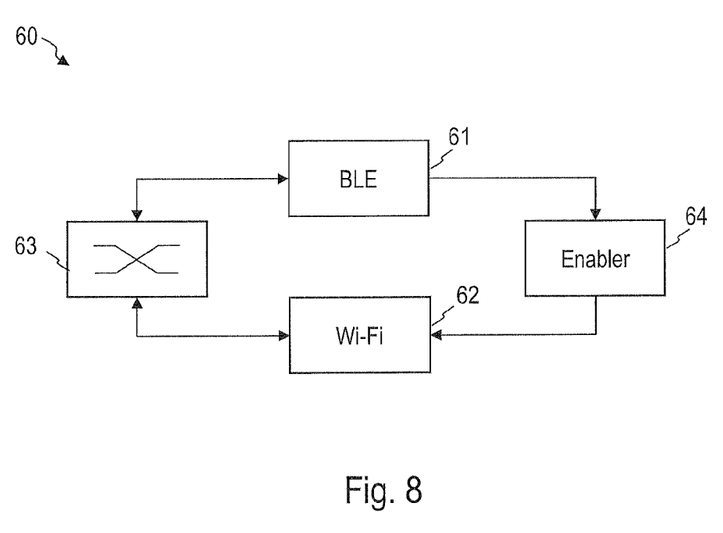
FIG. 8 is a block diagram representation of a portable electronic device according to an embodiment.

FIG. 8 is a block diagram of a portable electronic device 60 according to an embodiment. The portable electronic device 60 includes a first wireless interface which may be a BLE interface 61. The portable electronic device 60 includes a second wireless interface which may be a Wi-Fi interface 62.

The portable electronic device 60 comprises a bridging module 63 which performs network bridging between different radio techniques. The bridging module 63 may be configured to control the BLE interface 61 such that it transmits control messages which control the data traffic over the Wi-Fi interface 62. The bridging module 63 may be configured to process control messages received at BLE interface 61 to control the data traffic over the Wi-Fi interface 62. The bridging module 63 may be configured to monitor data traffic over the Wi-Fi interface 62 and to control the BLE interface 61 to transmit control messages which are generated based on the monitored data traffic.

The portable electronic device 60 comprises an enabler module 64 which selectively activates the Wi-Fi interface 62. The enabler module 64 may be configured to monitor a trigger event. The trigger event may be a routing request received at the BLE interface 61 from the further device. In response to detecting the trigger event, the enabler module 64 may control the Wi-Fi interface 62 to set up a Wi-Fi connection with the further device.

The functions of the bridging module 63 and/or of the enabler module 64 may be performed by the processing device 13 of the portable electronic device 10.

It will be appreciated that embodiments of the invention use different bearers for different functions needed in a network. The bearers are optimized for the respective tasks, i.e. low power connectivity and high bandwidth data communication. Low energy connectivity of a BLE interface may be combined with efficient high bandwidth connectivity of a Wi-Fi interface, thereby effectively creating a low power network device with high bandwidth data transfer capabilities.

In any one of the various embodiments, the first wireless interface may be used for various control functions and, optionally, also for services which require only a low data bit rate.

The portable electronic device may be configured to use the first wireless interface for service and device discovery.

Additionally or alternatively, the portable electronic device may be configured to use the first wireless interface for exchanging Wi-Fi connection details, e.g. parameters of the Wi-Fi connection which is to be established.

Additionally or alternatively, the portable electronic device may be configured to use the first wireless interface for exchanging and broadcasting network management parameters.

Additionally or alternatively, the portable electronic device may be configured to use the first wireless interface for monitoring beacons received from further device(s) located in proximity to the portable electronic device. The portable electronic device may be configured to update a mesh table with possible neighbors in the mesh network and, optionally, their locations. The portable electronic device may be configured to use this information for identifying routing paths in the mesh network.

Additionally or alternatively, the portable electronic device may be configured to use the first wireless interface to request establishment of a Wi-Fi connection or to receive a request for establishment of a Wi-Fi connection.

Additionally or alternatively, the portable electronic device may be configured to use the first wireless interface for low data rate services in the mesh network. Such services may include the transmission of sensor information, SMS, or voice communication.

Additionally or alternatively, the portable electronic device may be configured to use the first wireless interface for a generic broadcast function, which allows the network maintenance and distribution of small packets to all attached further devices to be improved.

While embodiments have been described with reference to the drawings, modifications may be implemented in other embodiments. For illustration, the first wireless interface does not need to be configured as a BLE interface, but may have a variety of other configurations. The first wireless interface may be a Bluetooth interface. The first wireless interface may be selected from a group consisting of Zigbee, Wibree, Near Field Communication (NFC), and Z-wave interfaces.

While portable electronic devices and/or the further devices according to embodiments may be implemented as user equipments of a cellular communication network, the devices may also have other configurations. For illustration, one or several of the further devices may be sensors having two wireless interfaces.

The invention claimed is:

1. A portable electronic device for a multi bearer communication with a further device, the portable electronic device comprising:
   a first wireless interface,
   a second wireless interface different from the first wireless interface, and
   a processing device coupled to the first wireless interface and to the second wireless interface, the processing device being configured to:
   perform a control signaling with the further device over the first wireless interface,
   selectively activate the second wireless interface to transmit data traffic to the further device and/or to receive the data traffic from the further device over the second wireless interface, and
   maintain the first wireless interface in an activated state to control the data traffic over the second wireless interface by the control signaling over the first wireless interface while the second wireless interface is in an activated state,
   wherein the processing device is configured to transmit and/or receive a control message over the first wireless interface for controlling the data traffic,
   wherein the control message is contained in a data packet having a size which is smaller than a threshold size to reduce transmission of the data traffic with small packet size over the second wireless interface, and
   wherein the processing device is configured to selectively transmit and/or receive low data rate traffic using the first wireless interface.

2. The portable electronic device of claim 1,
wherein the first wireless interface has a first power consumption when in the activated state and the activated second wireless interface has a second power consumption, the first power consumption being less than the second power consumption.

3. The portable electronic device of claim 1,
wherein the first wireless interface is configured for communication over a first bearer and the second wireless interface is configured for communication over a second bearer different from the first bearer.

4. The portable electronic device of claim 3,
wherein the second bearer is different from the first bearer in at least one of modulation technique or frequency band.

5. The portable electronic device of claim 1,
wherein the processing device is configured to selectively activate the second wireless interface in response to a trigger event for increasing a data communication bandwidth between the portable electronic device and the further device.

6. The portable electronic device of claim 5,
wherein the trigger event is receipt of a request for relaying the data traffic to or from the further device.

7. The portable electronic device of claim 6,
wherein the processing device is configured to relay the data traffic between a wide area network and the further device only over the second wireless interface.

8. The portable electronic device of claim 1,
wherein the processing device is configured to transmit and/or receive a control message over the first wireless interface,
wherein the control message transmitted over the first wireless interface is a control message for adjusting a data rate of the data traffic over the second interface.

9. The portable electronic device of claim 1,
wherein the processing device is configured to control the first wireless interface to transmit broadcast messages while the second wireless interface is in an activated state.

10. The portable electronic device of claim 1,
wherein the second wireless interface is configured to transmit and receive Wi-Fi signals.

11. The portable electronic device of claim 1,
wherein the first wireless interface is configured to transmit and receive Bluetooth Low Energy, BLE, signals.

12. A communication network, in particular a mesh network, comprising:
the portable electronic device of claim 1, and
a further device comprising:
a further first wireless interface configured for communication with the first wireless interface of the portable electronic device, and
a further second wireless interface configured for communication with the second wireless interface of the portable electronic device.

13. The portable electronic device of claim 1,
wherein the low data rate traffic transmitted over the first wireless interface comprises short message service (SMS), and/or voice communication.

14. The portable electronic device of claim 1,
wherein the data traffic using the second wireless interface comprises high data rate traffic,
wherein the portable electronic device is configured to selectively use the first wireless interface for the low data rate traffic and use the second wireless interface for the high data rate traffic.

15. A method of communicating in a multi bearer network, the method comprising:
operating a first wireless interface of a portable electronic device to perform a control signaling with a further device;
selectively activating a second wireless interface of the portable electronic device for transmitting data traffic to the further device and/or for receiving the data traffic from the further device, the second wireless interface being different from the first wireless interface; and
maintaining the first wireless interface in an activated state to control the data traffic over the second wireless interface by the control signaling over the first wireless interface while the second wireless interface is in an activated state,
transmitting and/or receiving a control message over the first wireless interface for controlling the data traffic, wherein the control message is contained in a data packet having a size which is smaller than a threshold size to reduce transmission of the data traffic with small packet size over the second wireless interface; and
selectively transmitting and/or receiving low data rate traffic using the first wireless interface.

16. The method of claim 15, wherein the operating, the selectively activating and the maintaining are performed by the portable electronic device.

17. The method of claim 15, further comprising:
wherein the control message transmitted over the first wireless interface is a control message for acknowledging receipt of a packet of the data traffic on the second interface.

18. A portable electronic device for a multi bearer communication with a further device, the portable electronic device comprising:
a first wireless interface,
a second wireless interface different from the first wireless interface, and
a processing device coupled to the first wireless interface and to the second wireless interface, the processing device being configured to:
perform a control signaling with the further device over the first wireless interface,
selectively activate the second wireless interface to transmit data traffic to the further device and/or to receive the data traffic from the further device over the second wireless interface, and
maintain the first wireless interface in an activated state to control the data traffic over the second wireless interface by the control signaling over the first wireless interface while the second wireless interface is in an activated state,
wherein the processing device is configured to transmit and/or receive a control message over the first wireless interface,
wherein the processing device is configured to selectively transmit and/or receive low data rate traffic using the first wireless interface, and
wherein the control message transmitted over the first wireless interface is a control message for acknowledging receipt of a packet of the data traffic on the second interface.

* * * * *

UNITED STATES PATENT AND TRADEMARK OFFICE
CERTIFICATE OF CORRECTION

PATENT NO. : 10,555,371 B2
APPLICATION NO. : 15/116900
DATED : February 4, 2020
INVENTOR(S) : Lars Nord Page 1 of 1

It is certified that error appears in the above-identified patent and that said Letters Patent is hereby corrected as shown below:

On the Title Page

Item (30):
Delete "(EP) 14154067" and insert -- (EP) 14154067.4 --

In the Claims

Column 16, Line 14, Claim 15:
Delete "interface; and" and insert -- interface; --

Signed and Sealed this
Twenty-sixth Day of May, 2020

Andrei Iancu
*Director of the United States Patent and Trademark Office*